Figures 1, 2:
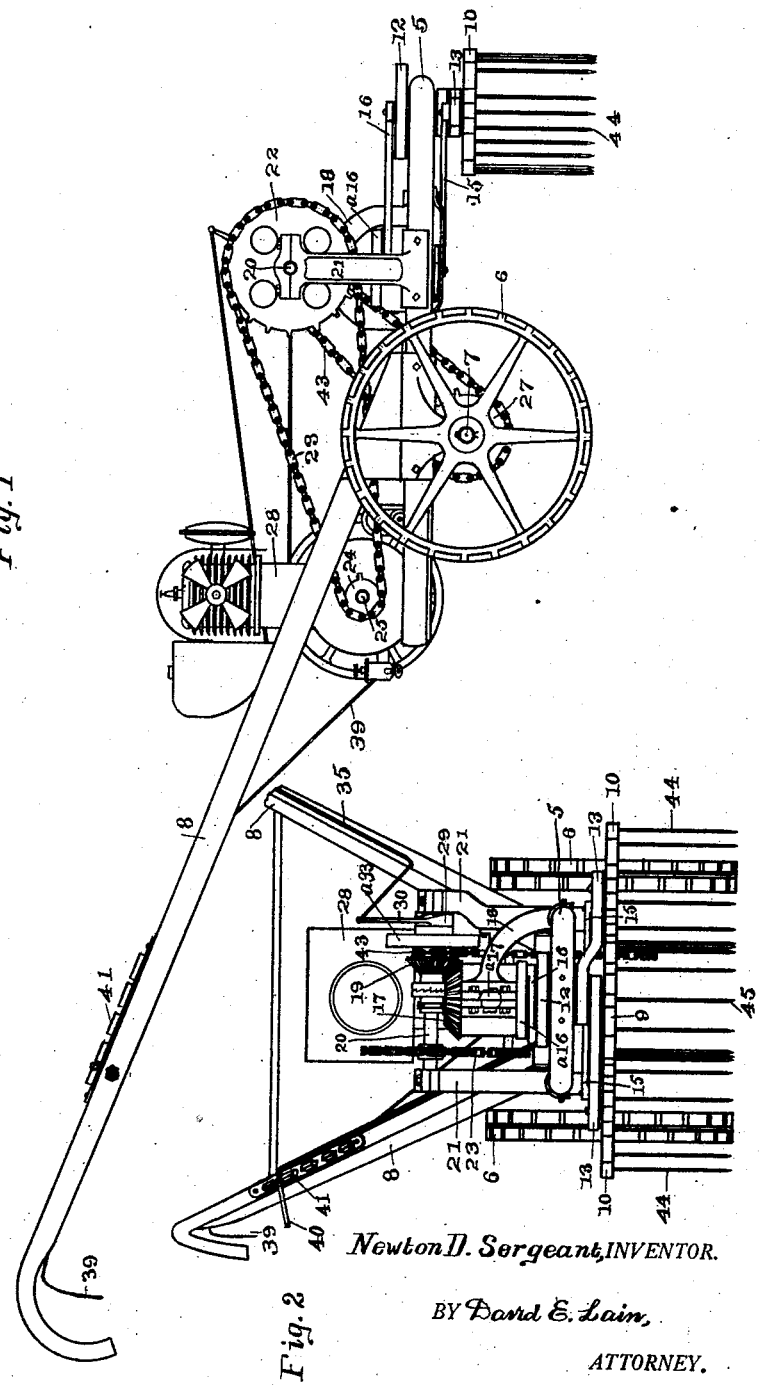

March 30, 1926.

N. D. SERGEANT

POWER CULTIVATOR 1,578,769

Original Filed June 28, 1921   2 Sheets-Sheet 1

Newton D. Sergeant, INVENTOR.

BY David E. Lain,

ATTORNEY.

March 30, 1926.  
N. D. SERGEANT  
POWER CULTIVATOR  
Original Filed June 28, 1921   2 Sheets-Sheet 2
1,578,769
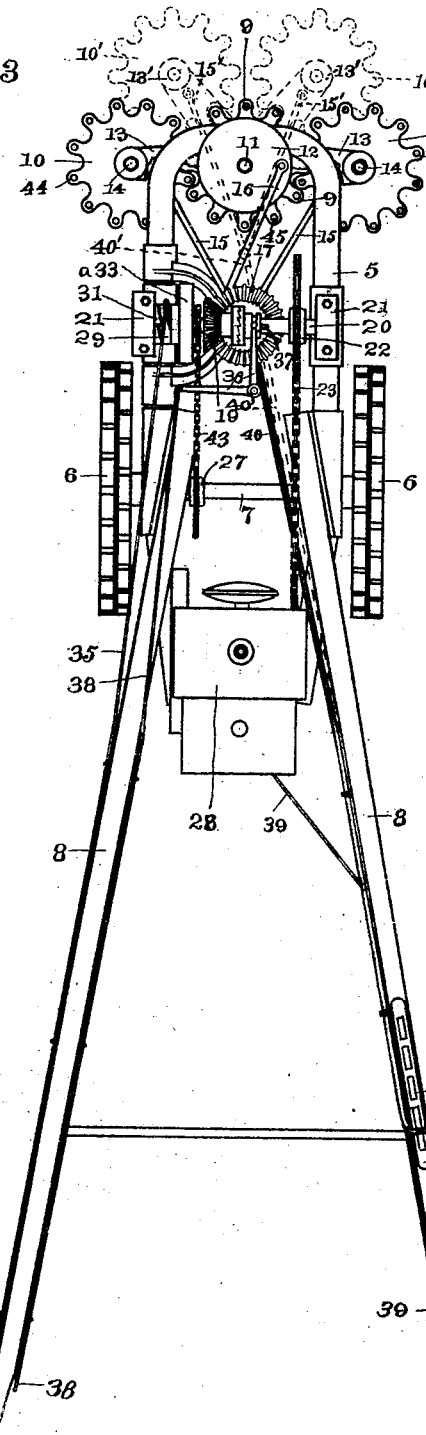
Newton D. Sergeant, INVENTOR.
BY David E. Lain,
ATTORNEY.

Patented Mar. 30, 1926.

1,578,769

UNITED STATES PATENT OFFICE.

NEWTON D. SERGEANT, OF SPRINGBROOK, WISCONSIN.

POWER CULTIVATOR.

Application filed June 28, 1921, Serial No. 481,002. Renewed June 8, 1925.

*To all whom it may concern:*

Be it known that I, NEWTON D. SERGEANT, a citizen of the United States, and residing at Springbrook, Wisconsin, in the county of Washburn, have invented a new and useful Power Cultivator, of which the following is a specification.

My invention relates to improvements in power cultivators, and the objects of my improvement are to provide a cultivator having oscillating, pendant rods for stirring the soil and destroying weeds, and also to place the cultivating means in front of the driving wheels and the power means behind the same.

I attain this object with the mechanism illustrated in the accompanying two sheets of drawings in which Figure 1 is a side elevation of my cultivator, Fig. 2 is a front end elevation of Fig. 1, Fig. 3 is a plan view of Fig. 1, and Fig. 4 is a separated view of a friction clutch in section on a medial vertical plane and drawn on a larger scale.

Similar characters refer to similar parts throughout. Certain parts are broken away to show other parts hidden thereby.

More particularly: The main frame of the cultivator is shown at 5. The two driving wheels are at 6, 6. The wheel axle on which said wheels are fixed is at 7, and this axle is mounted for revolution in bearings on frame 5. Two handles 8, 8 are fixed to frame 5. A spur gear 9 is fixed on the lower end of vertical shaft 11. And two spur gears 10, 10 are mounted for oscillation on vertical studs 14, 14 engaged with gear 9. Said vertical shaft 11 is mounted for oscillation in a bearing fastened to the front end of frame 5. A disc crank 12 is fixed on the upper end of said shaft 11. Two bearing arms 13, 13 are mounted for pivoting on shaft 11 between gear 9 and the bearing for said shaft. One of said studs 14, 14 is fixed in the outer end of each of arms 13 for mounting gears 10. Each of two shifting rods 15, 15 is connected to one of arms 13 and they are both connected with a bolt to the forward end of shifting rod 40. Connecting rod 16 connects crank disc $a^{16}$ with crank disc 12. Crank disc $a^{16}$ is fixed on the lower end of shaft $a^{17}$ which is mounted for revolution in a bearing on bracket 18. Beveled spur gear 17 is fixed on the upper end of shaft $a^{17}$. Said bearing bracket 18 is fastened to frame 5. Bevel gear 19 is mounted loose on shaft 20 engaged with gear 17 and is also engageable by a positive clutch 37. Said shaft 20 is mounted for revolution in bearings on brackets 21, 21 which are fastened to frame 5. A sprocket wheel 22 is fixed on shaft 20. Sprocket chain 23 connects sprockets 22 and 24. Said sprocket wheel 24 is fixed on the outer end of engine shaft 25, which is the shaft of gas engine 28. Cam ring 29 is mounted loose on said shaft 20, Fig. 4. A bearing sleeve $a^{29}$ is mounted for reciprocation on a spline on shaft 20. An arm 30 is fixed to cam ring 29. A cam boss 31 is formed on the inner end of right-hand bearing 21 engaged with cam ring 29. 32, 32 are two of four similar pivoted links connecting sleeve $a^{29}$ with friction blocks 33. Said friction blocks 33 bear on the inside of the band of friction wheel $a^{33}$ mounted for revolution on shaft 20. A helical spring 34 around said shaft 20 reacts between friction wheel $a^{33}$ and bearing sleeve $a^{29}$. Tension and compression control rod 35 is mounted for reciprocation under staples on left-hand handle 8, and extends from the hand hold of said handle to connect with cam-ring arm 30. Bellcrank 36 is engaged with positive clutch 37, reciprocal on a spline on shaft 20, and with control rod 38 reciprocal on left-hand handle 8. Control rod 39 is mounted for reciprocation on right-hand handle 8 and is connected to the gasoline valve. Control rod 40 is also mounted for reciprocation on right-hand handle 8 and is connected to rods 15, 15 for controlling the position of arms 13, 13. A rack 41 on said right-hand handle provides engagement lugs for the handle of control rod 40. A sprocket 42 fastened to friction wheel $a^{33}$ is connected by chain 43 to sprocket wheel 27. In each tooth of horizontal spur gear wheels 10, 10 are fastened one of pendant cultivator teeth 44. And in each of the teeth of spur gear 12 is fastened one of pendant cultivator teeth 45.

In operation: Assume engine 28 to be running, causing shafts 25 and 20 to revolve. With positive clutch 37 out of engagement, the running engine can not operate the cultivator. By pulling rod 38 said clutch is thrown into engagement and gears 19 and 17 are driven causing crank disc $a^{16}$ to revolve. Since the crank radius of $a^{16}$ is less than that of disc 12 the revolution of $a^{16}$ causes disc 12 to oscillate. Thus gears 9 and 10, 10 are caused to oscillate which compels similar transverse movements of all of cultivator rods or teeth 44 and 45. Meanwhile, if friction wheels $a^{33}$ is not engaged, driving wheels 6, 6 are stationary. To cause them to revolve rod 35 is pulled and said friction wheel revolves, turning said drivers through sprocket chain 43, thus forcing said cultivator teeth forward through the soil as they describe arcs of revolution therein. Blocks 33 can be caused to bear on wheel $a^{33}$ so lightly by the set of rod 35 that they will slip somewhat and propel the cultivator at a slower rate than if set harder. Also the rate of forward movement of the cultivator can be modified by the amount of gasoline fed into the engine as controlled by rod 39. The depth of cultivation effected by teeth 44 and 45 is governed by the position of handles 8 as carried by the operator. The width of the strip cultivated can vary from full width, for which arms 13 are shown in full lines, to narrowest width for which said arms are shown in dotted lines at 13'. Control rods 35, 38, 39 and 40 are assumed to be stiff enough for use as compression rods for returning the described adjustable parts from their operative to their nonoperative positions. Thus the operations are caused to cease by shoving said control rods back.

Conveniently placed fastening bolts, not shown, make removal of the cultivator-teeth mechanism easy. When so removed the cultivator becomes a convenient small tractor.

Having thus fully disclosed my invention, what I claim is new and desire to secure by Letters Patent is,—

1. In a power cultivator in combination, a frame, a vertical drive shaft rotatable in bearings on said frame, a drive crank fixed to said drive shaft, a vertical driven shaft rotatable in bearings on said frame, a driven crank longer than said drive crank fixed on said driven shaft, a connecting rod between said drive and driven cranks, a spur gear fixed on said driven shaft, two arms loosely mounted on said driven shaft, a vertical shaft mounted in each arm, each of said shafts carrying a gear meshing with said spur gear, cultivator teeth at the lower end of each of said driven shafts, means for adjusting said arms about their pivots, and means for rotating said drive shaft.

2. In a power cultivator in combination, a frame, a wheel shaft rotatable on said frame, two vehicle tractor wheels rigidly mounted on said shaft, a prime mover mounted on said frame, controllable power connections between said prime mover and said wheel shaft, a drive shaft vertically rotatable in bearings on said frame, a spur gear rotatable in a vertical axis in bearings on said frame, power connections between said drive shaft and said driver gear whereby when said shaft revolves said gear oscillates, two arms loosely mounted on said driven shaft, a vertical shaft mounted in each arm, each of said shafts carrying a gear meshing with said spur gear, cultivator teeth at the lower end of each of said driven shafts, means for adjusting said arms about their pivots, and means for connecting said drive shaft to said prime mover.

NEWTON D. SERGEANT.